UNITED STATES PATENT OFFICE.

HENRI LOUIS HERRENSCHMIDT, OF PETIT-QUEVILLY, FRANCE.

PROCESS OF SEPARATING NICKEL FROM ITS ORES.

SPECIFICATION forming part of Letters Patent No. 466,495, dated January 5, 1892.

Application filed May 13, 1891. Serial No. 392,591. (No specimens.)

*To all whom it may concern:*

Be it known that I, HENRI LOUIS HERRENSCHMIDT, of the city of Petit-Quevilly, (Seine Inférieure,) France, have invented Improved Processes for the Treatment of Silicated Nickel Ores and Pyritic Ores of Nickel and Copper with or without Cobalt, of which the following is a full, clear, and exact description.

Pyritic ores containing copper and nickel, such as those of Sudbury, in Canada, or other like ores, after undergoing a preliminary roasting, are treated for the production of a matte containing about thirty per cent. of copper and ten to twenty per cent. of nickel, the remainder consisting of iron and sulphur. This matte is obtained by fusion in a cupola or blast-furnace with the necessary fluxes for producing a fluid slag. If the pyritic ores of nickel and copper are sufficiently rich in sulphur, it is only necessary to crush and wash them, so as to sulphate the nickel and copper, thereby avoiding the cost and loss incidental to the fusion of the ore for obtaining the matte.

The silicated nickel ores of New Caledonia and other similar ores are treated for the purpose of obtaining a matte containing generally about thirty per cent. of copper and fifteen to twenty per cent. of nickel, with some iron and sulphur. For this purpose they are melted in a cupola or blast-furnace along with a suitable proportion of copper pyrites or other cupreous matters and the necessary fluxes, according to the composition of the hearth. The mattes of copper and nickel obtained from one or other of those classes of ore, silicated or pyritic, or any other similar mattes, or the nickel and copper pyrites themselves, if sufficiently rich in sulphur to be directly treated, are crushed, and then undergo the following treatment in order to extract the useful metals contained: The crushed mattes are carefully roasted for the purpose of converting as completely as possible the nickel and copper into sulphates and the iron into oxide. The mattes or roasted ores are subjected to a methodical lixiviation, so as to obtain a sulphate liquor of a density of about 12° Baumé containing nickel, copper, and a little iron in the form of sulphates. The sulphates in the liquor are converted into chlorides by the addition of a chloride, preferably chloride of calcium, (which may be regenerated for use over again,) sulphate of lime being precipitated. To the liquor, without decanting it, is added precipitated hydrated oxide of copper or carbonate of copper, or there may be added carbonate of lime, which precipitates perchloride of iron and a portion of the copper. The liquor is then boiled, when the whole of the iron remaining in solution in the form of protochloride precipitates, while the copper precipitated becomes redissolved. There remains a pure nickel and copper liquor, which is separated from the precipitate containing sulphate of lime and iron either by decanting and washing or by filtering and washing. In order to separate in the chloridized nickel and copper liquor thus obtained the nickel from the copper, oxide of nickel or carbonate of nickel is employed. Nickel precipitated in the form of oxide or carbonate in any nickel liquor will serve for the purpose. In practice it is preferred to take a certain quantity of chlorides of nickel and copper liquor and precipitate, by means of milk of lime or an alkaline carbonate, the two metals in the form of oxides or of carbonates, after which the liquor is decanted. The calcium chloride decanted off may be employed to chloridize at the beginning of the treatment a fresh batch of sulphate liquor. To the precipitated oxides of nickel and copper or of carbonates obtained is added a fresh quantity of the chloride of nickel and copper liquor, which gives rise to the following fundamental reaction: The oxide or carbonate of nickel in the precipitate redissolves and is replaced by a corresponding proportion of the copper in the liquor which precipitates. After letting settle and decanting there are added to the same precipitate fresh portions of the initial chloride of nickel and copper liquor in succession until there is no longer any displacement of the metals, which indicates that there no longer remains any nickel in the precipitate, which is thenceforth exclusively cupreous. The operation succeeds well in the cold. The nickel and copper of the last liquor are precipitated by means of lime or an alkaline carbonate and serve for effecting the separation of the metals in fresh chloridized liquors. The liquors previously decanted contain only nickel in the form of chloride. These liquors are treated in two ways: first, by evaporation and calcination, producing pure oxide of nickel and hydrochloric acid; second, by precipitation with lime, producing oxide of nickel and calcium chloride. The separation of the nickel and copper is thus completely effected. If, instead of preparing oxide of nickel and oxide of copper, it is desired to directly produce sulphate of nickel and precipitated oxide of copper, the operation is conducted in a slightly different manner. Taking, as before, the initial sulphate of nickel and copper liquor, the iron is removed with the aid of heat by virtue of the above-described reaction by means of a washed precipitate of oxide of copper or of carbonate of copper. A certain portion only of this sulphated liquor is chloridized, and the nickel and copper in this chloridized portion are precipitated by lime or an alkaline carbonate. The precipitate thus obtained, after being washed, serves to effect the displacement of the metals in the sulphate liquor, the precipitated nickel redissolving in the form of sulphate of nickel at the expense of an equivalent quantity of copper which precipitates. The nickel and copper sulphate liquor may also be treated directly from the commencement of the operation by employing soda or potash or the carbonate of either as precipitating agents instead of lime. The separation of the metals is effected in this case in the same manner as before, but less advantageously. If the ores or mattes under treatment contain cobalt in addition to nickel and copper, it will go along with the nickel, and after separation of the copper precipitate, as before described, nickel and cobalt liquors will be obtained instead of nickel liquors only. From a certain proportion A of these nickel and cobalt liquors the two metals are precipitated by means of lime. The mixed precipitate of oxide of nickel and oxide of cobalt is transferred into a suitable vessel with a sufficient quantity of water, and is then subjected to the combined action of a current of chlorine gas and air blown in under pressure, whereby the highest degree of oxidation is attained, the oxides becoming converted into peroxides of cobalt and nickel. To the mixed peroxides of cobalt and nickel is added a fresh quantity B of the original cobalt and nickel liquors from which the portion A was previously taken, and steam is blown in to thoroughly agitate, the result being a singular displacement of the metals, as in the case of the separation of the nickel and copper. The nickel of the precipitate ore dissolves and is replaced by an equivalent quantity of cobalt from the liquor, which peroxidizes and precipitates. As the fraction B of cobalt and nickel liquor first added is so proportioned as not to displace the whole of the nickel in the precipitate, it follows that only nickel will remain in solution after the reaction is terminated. The solution, which has thus become purely nickeliferous, is decanted and a fresh addition C of the original liquor is made, which furnishes a second nickel solution, provided it is still insufficient to take up the whole of the nickel remaining in the precipitated peroxides treated. When after a last addition of liquor there remains in the precipitate only pure peroxide of cobalt, the operation is completed. The several solutions containing nickel only are added together and the metal is precipitated in the form of oxide of nickel by means of lime. In this manner the separation of the nickel and cobalt is effected.

I claim—

1. The herein-described process of separating iron from nickel and copper sulphate solutions, which consists in, first, adding a chloride to said solution to convert the nickel and copper sulphates into chlorides; second, adding a cupric salt to the chloride solution and boiling the same to precipitate the iron, and, finally, separating the nickel and copper liquor from the precipitated iron by decantation or filtration, substantially as described.

2. The herein-described process of separating nickel chloride from nickel and copper chloride solutions, which consists in, first, adding a nickel salt to the solution to precipitate a salt of copper and of nickel, and then adding successive quantities of nickel and copper chloride solution and decanting until the nickel salt is dissolved and removed and copper salt is precipitated, substantially as described.

3. The herein-described process of separating nickel from any cobalt in nickel liquors, which consists in, first, adding lime to the liquors and precipitating nickel and cobalt; second, adding water to said precipitated nickel and cobalt; third, oxidizing this solution by means of a current of chlorine gas and air; fourth, adding to the mixed oxidized nickel and cobalt solution successive portions of the original nickel and cobalt with steam and decanting the solution of nickel until the cobalt is precipitated, substantially as described.

4. The herein-described process of separating nickel from nickel ores and pyrites, which consists in, first, crushing and roasting the matte to convert the ore into sulphates of copper and nickel; second, lixiviating said sulphates of copper and nickel; third, chloridizing the solution thus formed; fourth, adding a copper salt to and precipitating the iron in the solution; fifth, adding a salt of nickel to the solution of copper and nickel sulphate to separate the nickel from the copper; lastly, evaporating and calcining the solution of nickel thus obtained to produce oxide of nickel, substantially as described.

The foregoing specification of my improved processes for the treatment of silicated nickel ores and pyritic ores of nickel and copper with or without cobalt signed by me this 29th day of April, 1891.

HENRI LOUIS HERRENSCHMIDT.

Witnesses:
ROBT. M. HOOPER,
ALBERT MOREAU.